(12) United States Patent
Looper (10) Patent No.: US 12,315,074 B1
(45) Date of Patent: May 27, 2025

(54) SYSTEMS AND METHODS FOR DYNAMIC STREAMING OF SPLATS

(71) Applicant: Illuscio, Inc., Culver City, CA (US)

(72) Inventor: Sean Looper, Flagstaff, AZ (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 19/088,195

(22) Filed: Mar. 24, 2025

Related U.S. Application Data (63) Continuation of application No. 18/913,639, filed on Oct. 11, 2024, now Pat. No. 12,266,050.

(51) Int. Cl.
*G06T 15/20* (2011.01)

(52) U.S. Cl.
CPC .................... *G06T 15/20* (2013.01)

(58) Field of Classification Search
CPC ...................................... G06T 15/20
See application file for complete search history.

(56) References Cited

U.S. PATENT DOCUMENTS

| | | | |
|---|---|---|---|
| 2022/0366638 A1* | 11/2022 | Lasram | G06T 7/251 |
| 2023/0128662 A1* | 4/2023 | Lee | G06F 3/013 345/419 |
| 2024/0355047 A1 | 10/2024 | Supikov et al. | |
| 2024/0371082 A1 | 11/2024 | Goyal et al. | |

* cited by examiner

*Primary Examiner* — Peter Hoang
(74) *Attorney, Agent, or Firm* — Ansari Katiraei LLP; Arman Katiraei; Sadiq Ansari (57) ABSTRACT

A system and associated methods select splats at different fidelities to optimize a requested field-of-view of a three-dimensional (3D) model for presentation on a local device or for streaming to a remote device. The system determines priority values that are associated with parts of the 3D model within the field-of-view, selects first splats that represent a first part of the 3D model at a first fidelity in response to a first priority value being associated with the first part, selects second splats that represent a second part of the 3D model at a second fidelity in response to a second priority value being associated with the second part, and presents or streams the first splats and the second splats in response to the request in order to generate the field-of-view with different fidelities for the first part and the second part of the 3D model.

20 Claims, 9 Drawing Sheets

SYSTEMS AND METHODS FOR DYNAMIC STREAMING OF SPLATS

CLAIM OF BENEFIT TO RELATED APPLICATIONS

This application is a continuation of U.S. nonprovisional application Ser. No. 18/913,639 with the title "Systems and Methods for Dynamic Streaming of Splats", filed Oct. 11, 2024, now issued as U.S. Pat. No. 12,266,050. The contents of application Ser. No. 18/913,639 are hereby incorporated by reference.

BACKGROUND

Three-dimensional (3D) models are large files that require large amounts of compute power to generate, large amounts of bandwidth to distribute over a data network, and large amounts of rendering resources to visualize onscreen and interact with in a seamless and uninterrupted manner. Splatting (e.g., Gaussian splatting) is a technique for generating high-quality 3D models with less data relative to 3D models that are defined with meshes or points.

Splatting techniques include a loss function to compare different splat representations of a 3D model against the 3D model and to retain the representation that is the closest match to the 3D model. As a result, the fidelity or detail in some parts of the splat representation are unnecessary or add little to the end user experience when users rarely focus or view those parts. Accordingly, the fidelity or detail in the rarely-viewed parts adds to the streaming and/or rendering overhead of the splat representation and therefore introduces unnecessary delay and resource utilization.

DETAILED DESCRIPTION OF PREFERRED EMBODIMENTS

The following detailed description refers to the accompanying drawings. The same reference numbers in different drawings may identify the same or similar elements.

Provided are systems and methods for the dynamic streaming of splats. The dynamic streaming involves tracking user viewing of different parts of a three-dimensional (3D) model, generating a heatmap that associates values to and/or prioritizes the different parts based on the tracked viewing, and streaming the splat representations of the 3D model at different fidelities based on a user's current viewing position within the 3D space of the 3D model and the one or more heatmap values defined for the 3D model components that are visible from the current viewing position.

The dynamic streaming reduces bandwidth and streaming overhead when the user focus is on parts of the 3D model that have low priority values by providing those parts at a lower fidelity and/or with fewer splats than the fidelity and/or number of splats generated for the closest match to the original 3D model. Conversely, the dynamic streaming increases fidelity and/or provides more splats for parts of the 3D model that have high priority values when the user focus is on those parts. Accordingly, the dynamic streaming may include streaming the splats representing the 3D model from a particular field-of-view with different fidelities with frequently or consistently viewed parts being streamed with a greater density and number of smaller-sized splats and with infrequently or inconsistently viewed parts being streaming with a lower density and number of larger-sized splats.

Figure 1:
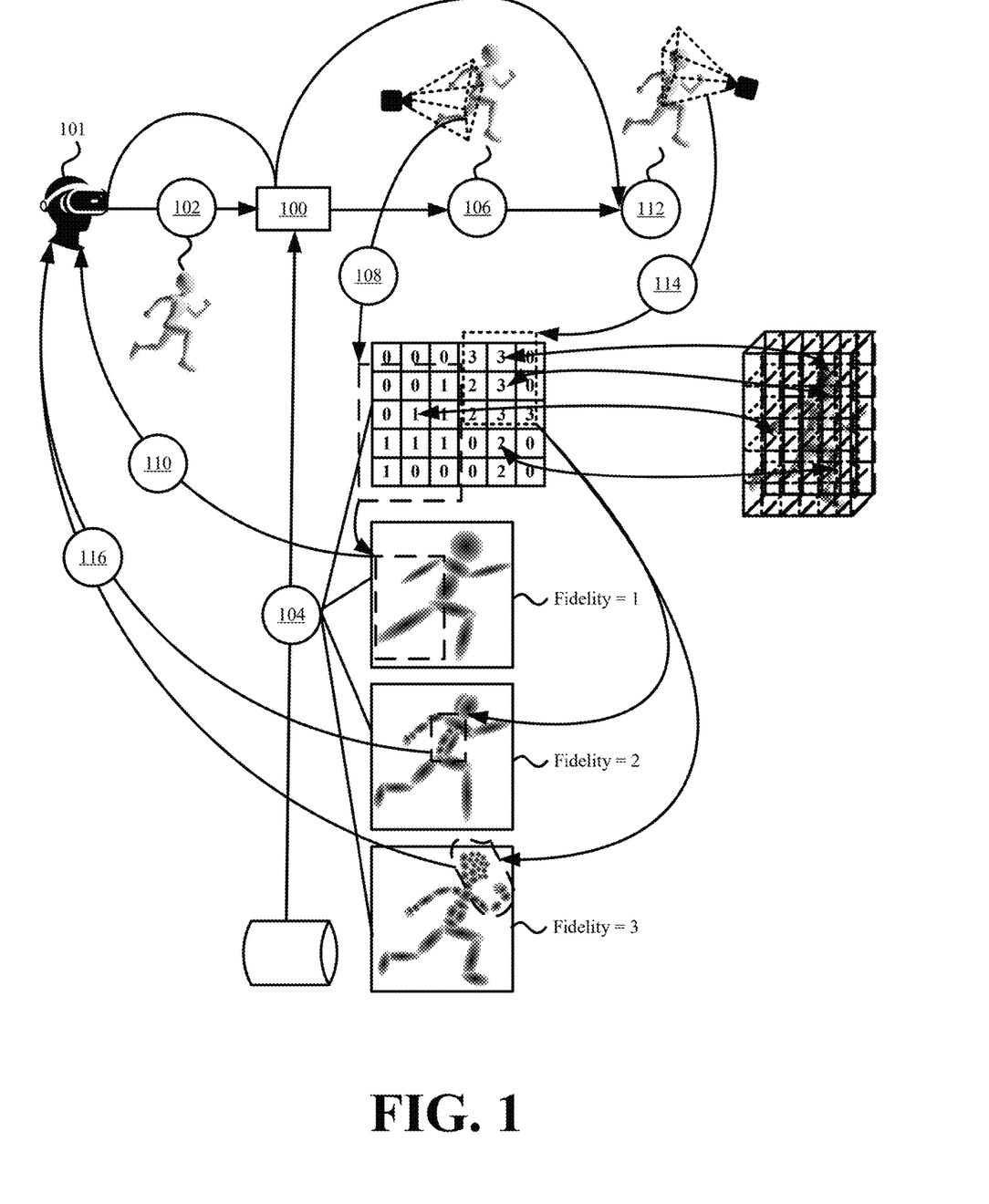
FIG. 1 illustrates an example of the dynamic streaming of splats in accordance with some embodiments presented herein.

FIG. 1 illustrates an example of the dynamic streaming of splats in accordance with some embodiments presented herein. Streaming system 100 receives (at 102) a request to access a 3D model from client device 101. For instance, client device 101 issues a HyperText Transfer Protocol (HTTP) GET request with the name, Uniform Resource Locator (URL), or other identifier for requesting the 3D model from streaming system 100. In some embodiments, the request may be issued according to the specifications of a streaming protocol for 3D assets or 3D content (e.g., static 3D models, 3D animations, 3D movies, 3D games, spatial computing experiences, virtual, mixed, or enhanced reality experiences, and/or other virtual 3D environments). In some embodiments, the request specifies a starting position or location for a virtual camera in the 3D space of the 3D model from which to view the 3D model. In some other embodiments, the request does not specify the starting position or location for the virtual camera. In some such embodiments, the request is for the 3D model from a default or predefined initial view.

Streaming system 100 retrieves (at 104) the splats that are defined for the 3D model and a heatmap that is generated from tracking the viewing path of users that previously requested the 3D model. The splats may be generated using a Gaussian splatting technique, radiance field, neural network, deep learning model, photogrammetry, or other splat generation technique. Each splat is a 3D modeling primitive or volumetric primitive with a position and visual characteristics. The position may be defined with a coordinate in 3D space, a radius or shape, and/or a covariance. Accordingly, the splat may have an oval, ellipsoidal, or other shape that spans a region or volume of the 3D space. The visual characteristics of the splat may include opacity and/or color parameters or spherical harmonics.

The retrieved (at 104) splats represent the 3D model at different fidelities. For instance, a first set of splats may represent or recreate the 3D model at a first low level of fidelity, quality, or detail. A second set of splats may be defined in addition to or in place of some of the first set of splats to increase the fidelity, quality, or detail for first parts of the 3D model that received more user focus or were tracked to have more frequent and/or consistent viewership than second parts of the 3D model. A third set of splats may be defined in addition to or in place of the some of the second set of splats and/or some of the first set of splats to further increase the fidelity, quality, or detail for third parts of the 3D model that received more frequent or consistent user focus or were tracked to have more viewership than the first parts of the 3D model. The third set of splats may have a greater density of smaller-sized splats for a similarly sized region of the 3D model than the second set of splats to capture more fidelity, quality, or detail in that similarly sized region. Similarly, the second set of splats may have a greater density of smaller-sized for a similarly sized region of the 3D model than the first set of splats to capture more fidelity, quality, or detail in that similarly sized region. The splats defined for the 3D model may be associated with a priority or heatmap value. For instance, continuing with the example from above, the first set of splats may be defined and/or associated with a first value in the heatmap for the lowest fidelity, the second set of splats may be defined and/or associated with a second value in the heatmap for a medium fidelity, and the third set of splats may be defined and/or associated with a third value in the heatmap for the highest fidelity.

Streaming system 100 determines (at 106) a first position from which to present the 3D model to client device 101. The first position may correspond to a first location and orientation of a virtual camera in the 3D space of the 3D model. In some embodiments, the first position is specified in the received (at 102) request. In some embodiments, the first position is a default or initial position at which the 3D model is initially presented to a requesting device. In some embodiments, the first position is defined or adjusted by user input.

Streaming system 100 determines (at 108) that first parts of the 3D model that are in the field-of-view from the first position are associated with a lowest priority value in the heatmap. Accordingly, streaming system 100 presents or streams (at 110) the splats representing the first parts at the lowest fidelity in response to the request for the 3D model at the first position. Presenting the splats may include loading the splats into memory of a local device or a Graphics Processing Unit (GPU) for rendering when streaming system 100 is integrated as part of the local device.

Streaming system 100 receives (at 112) a second request for the 3D model at a second position. The second request may be issued from client device 101 in response to a user input or interaction that moves the position of a virtual camera in the 3D space of the 3D model or that moves the 3D model (e.g., rotate, transform, edit, etc.). In some embodiments, the second request may be generated by streaming system 100 in response to tracking a change in the position of the virtual camera or the position of the 3D model.

Streaming system 100 determines (at 114) that second parts of the 3D model that are in the field-of-view from the second position are associated with a highest priority value in the heatmap and that third parts of the 3D model in the field-of-view from the second position are associated with a middle priority value in the heatmap. Accordingly, streaming system 100 presents or streams (at 116) the splats representing the second parts at the highest fidelity and the splats representing the third parts at the middle fidelity.

Streaming system 100 therefore provides the different parts of the 3D model at different resolutions or levels of fidelity, quality, or detail based on prior tracked viewing of those different parts. Consequently, the lesser important or less frequently viewed parts of the 3D model are streamed with less data and detail than the more important or more frequently viewed parts of the 3D model.

In some embodiments, streaming system 100 performs the dynamic streaming based on a subset of the heatmap values for the parts of the 3D model that are in the current field-of-view. In some such embodiments, streaming system 100 bases the fidelity of the splats for all parts of the 3D model in the field-of-view on the heatmap values for the parts of the 3D model that are at the center of the field-of-view. In other words, streaming system 100 may ignore the heatmap values for the parts of the 3D model that are in the field-of-view periphery or may automatically stream the parts of the 3D model that are in the field-of-view periphery at the lowest fidelity and adjust the fidelity for the parts of the 3D model that are in the field-of-view center based on the heatmap values specified for those parts.

Figure 2:
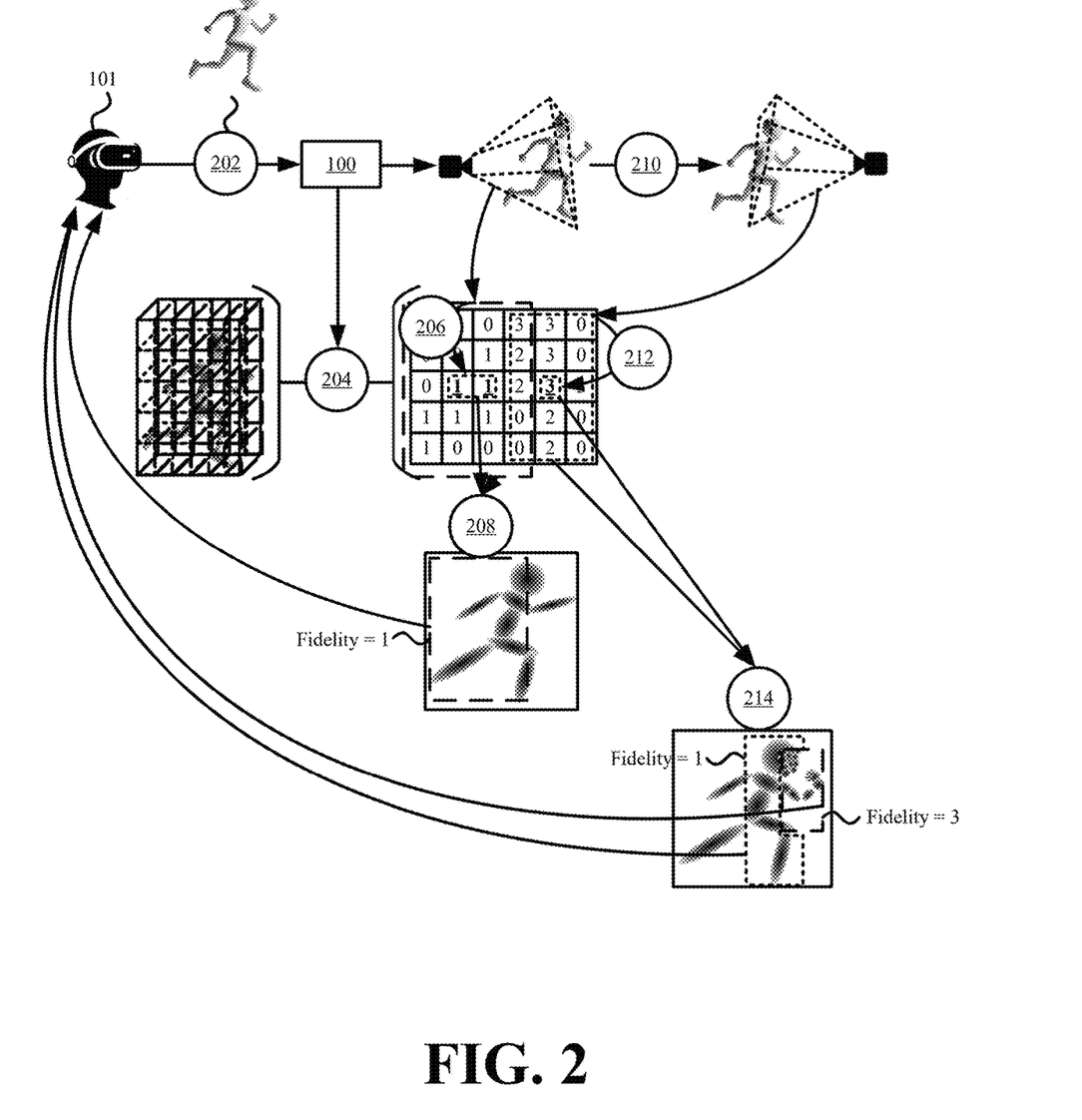
FIG. 2 illustrates an example of the dynamic streaming based on heatmap values that are aligned with a particular part of a three-dimensional (3D) model in the field-of-view in accordance with some embodiments presented herein.

FIG. 2 illustrates an example of the dynamic streaming based on heatmap values that are aligned with a particular part of a 3D model in the field-of-view in accordance with some embodiments presented herein. Streaming system 100 receives (at 202) a request for presenting the 3D model from a first perspective or position.

Streaming system 100 aligns (at 204) the heatmap that is generated for the 3D model based on tracked user viewing of the 3D model with the 3D model presented from the first perspective or position. Streaming system 100 may rotate, reorient, or otherwise match points-of-reference in the heatmap to corresponding points-of-reference on the 3D model in order to align (at 204) the heatmap with the 3D model.

Streaming system 100 determines (at 206) the heatmap values for the 3D model parts at the center of the field-of-view created from the first perspective or position. The 3D model parts may correspond to one or more regions or volumes of the 3D model at the field-of-view center that align with one or more of the heatmap values generated for those regions or volumes or may correspond to individual primitives (e.g., meshes, points, splats, etc.) of the 3D model at the field-of-view center that align with one or more of heatmap values generated for those primitives.

Streaming system 100 selects (at 208) splats to represent the field-of-view with first parts of the 3D model around the field-of-view center at a fidelity that is associated with the heatmap values specified for the 3D model parts at the field-of-view center and with second parts in the periphery of the field-of-view at a default low fidelity. As shown in FIG. 2, the heatmap values specify a low fidelity for the first parts of the 3D model at the field-of-view center. Accordingly, streaming system 100 selects (at 208) a first low-density small number of larger-sized splats to represent the first parts of the 3D model and a similar low-density small number of larger-sized splats to represent the second parts of the 3D model at the field-of-view periphery. Streaming system 100 streams the selected (at 208) splats for the field-of-view to a requesting client device.

In response to user input, the field-of-view changes (at 210) from presenting the 3D model at the first perspective or position to a second perspective or position. Some of the second parts of the 3D model that were previously at the field-of-view periphery from the first perspective or position are now located at the field-of-view center from the second perspective or position.

Streaming system 100 determines (at 212) the heatmap values for the second parts of the 3D model that are now at the center of the field-of-view created from the second perspective or position. The heatmap values for the second parts specify a higher priority or fidelity for the second parts than the first parts.

Accordingly, streaming system 100 selects (at 214) splats to represent the field-of-view with the second parts of the 3D model at a higher or greater fidelity than the first parts of the 3D model and other parts of the 3D model now at the periphery and/or than when the same second parts of the 3D model were at the field-of-view periphery. For instance, streaming system 100 may add new splats to the low fidelity splat representation of the second parts with the new splats providing additional structural variety and/or detail as well as more granular coloring to the second parts. In some embodiments, streaming system 100 selects (at 214) a high-density and greater number of smaller-sized splats to represent the second parts of the 3D model at the field-of-view center with a higher fidelity than the splats used to represent the second parts of the 3D model at the field-of-view periphery. Streaming system 100 also selects (at 214) splats to represent the first parts and other third parts that are now in the field-of-view periphery at the low fidelity. Accordingly, a smaller and greater number of splats are selected (at 214) to represent the field-of-view center and a larger and fewer number of splats are selected (at 214) to represent the field-of-view periphery. Streaming system 100 presents or streams the selected (at 214) splats for the field-of-view at the second perspective or position to the requesting client device. Streaming system 100 presents the selected (at 214) splats when the received (at 202) request originates from an application that runs on the same device as streaming system 100. Streaming system 100 streams the selected (at 214) splats when the request is received (at 202) over a data network from a remote device.

In some embodiments, streaming system 100 generates the heatmap based on a creator intent. In some such embodiments, a user selects different regions or parts of the 3D model, and manually specifies a priority for the selected regions or parts. The selected regions or parts are mapped to corresponding positions in the heatmap, and the priority specified for the selected regions or parts is entered defined at the corresponding positions in the heatmap.

In some embodiments, streaming system 100 generates the heatmap by tracking the paths by which different users view or render the 3D model or similarly classified 3D models. From the viewing paths, streaming system 100 determines the regions or parts of the 3D model that are in the field-of-view and the time that those regions or parts remain in the field-of-view. Streaming system 100 analyzes the tracked viewing paths of different users for a particular 3D model over time to detect convergence about specific regions. The convergence may correspond to the average viewing path of the particular 3D model taken by the tracked users.

Streaming system 100 may optimize the generation of the splats for the particular 3D model based on the detected viewing path convergence. Optimizing the splat generation includes increasing the number and fidelity of the splats used to represent the regions or parts that are located on or around the converged viewing path and to gradually decrease or retain the number and fidelity of the splats used to represent the regions or parts that are further removed from the converged viewing path.

In some embodiments, optimizing the splat generation includes performing a first iterative pass to generate splats that represent all regions or parts of the particular 3D model at a uniform and/or low fidelity. In some such embodiments, streaming system 100 performs additional iterative passes based on the converged viewing path to increase detail and fidelity to the regions or parts based on their relative closeness to or distance from the converged viewing path. Specifically, streaming system 100 retrains or refines the splat representations for the regions or parts about the converged viewing path by generating more-and-more increasingly smaller sized and higher fidelity splats for the regions or parts that are increasingly closer to the converged viewing path.

Figure 3:
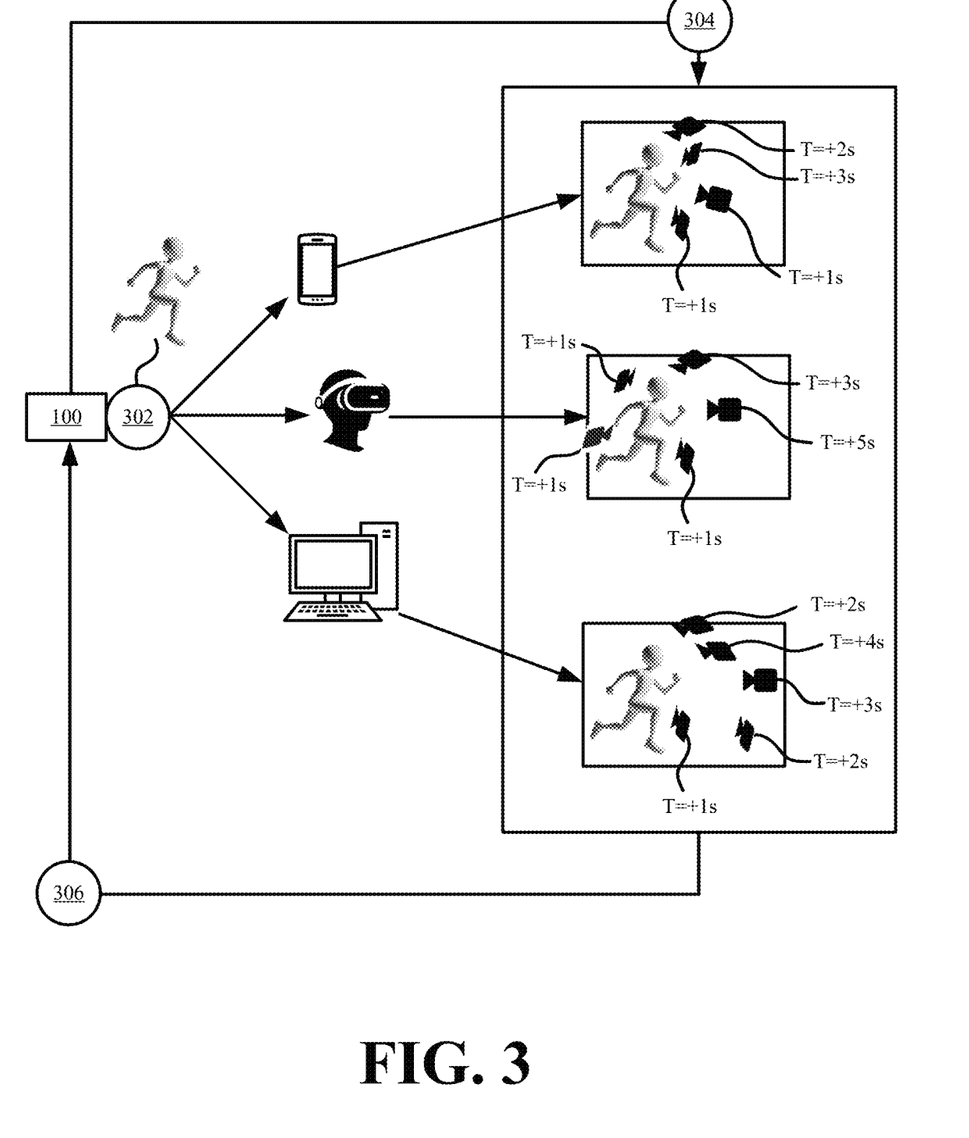
FIG. 3 illustrates an example of the viewing path tracking in accordance with some embodiments presented herein.

FIG. 3 illustrates an example of the viewing path tracking in accordance with some embodiments presented herein. Streaming system 100 distributes (at 302) a 3D model to different client devices that request access to the 3D model. The distributed (at 302) 3D model may be defined with meshes, points, splats, or primitives of another 3D format.

Streaming system 100 tracks (at 304) the viewing path of the user associated with each client device. Specifically, the 3D model is presented in a 3D space from a render position. The render position may be defined by the position and orientation of a virtual camera in the 3D space. The 3D model may be presented with the same initial or default view and/or the same initial or default virtual camera position and orientation. However, each user may move the virtual camera anywhere in the 3D space and may reorient the virtual camera to change the field-of-view at which the 3D model is presented. In some embodiments, streaming system 100 tracks (at 304) the position and orientation of the virtual camera along with a time component that establishes the amount of time for each field-of-view established with the virtual camera at a particular position with a particular orientation. In some other embodiments, tracking (at 304) the viewing path includes generating priority values for different volumes or regions of the 3D model with the priority value for a given volume or region being based on the amount of time that the given volume or region is in the field-of-view and/or the proximity of the given volume or region to the field-of-view center.

Streaming system 100 aggregates (at 306) the viewing paths that are tracked (at 304) each time the 3D model is requested and distributed to a client device. Streaming system 100 may store or associate the aggregated (at 306) viewing paths of a 3D model with that 3D model. Streaming system 100 may also store a timestamp with each viewing path to indicate the date and/or time when that viewing path was tracked. The timestamps may be used to bias the viewing paths when performing the viewing path convergence. For instance, more recent viewing paths may influence the converged viewing path more than older viewing path to account for changing viewing behaviors.

Figure 4:
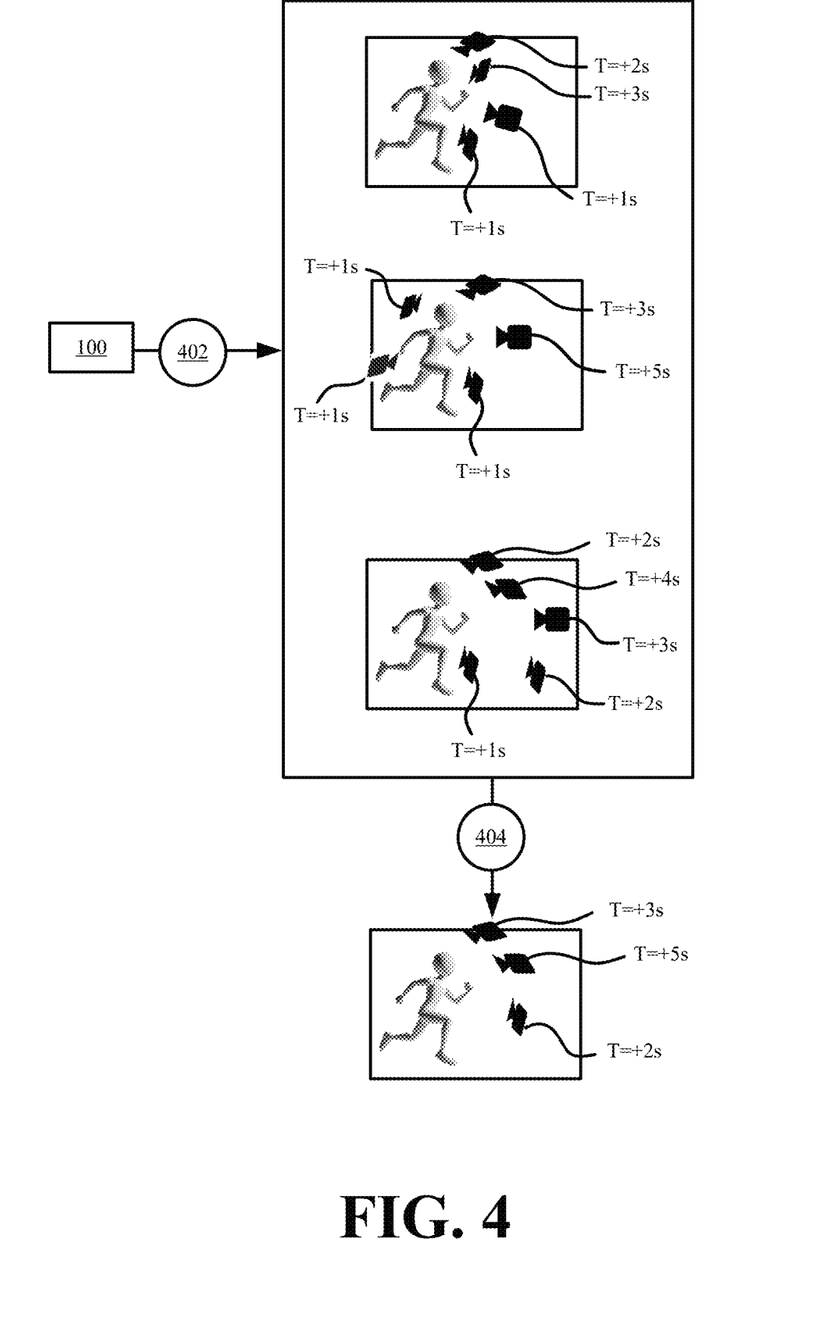
FIG. 4 illustrates an example of converging the viewing paths of a 3D model in accordance with some embodiments presented herein.

FIG. 4 illustrates an example of converging the viewing paths of a 3D model in accordance with some embodiments presented herein. Converging the viewing paths may include selecting (at 402) the individual user viewing paths that have been tracked and/or aggregated for a particular 3D model, evaluating the individual user viewing paths, and determining (at 404) a converged viewing path for the commonly or consistently viewing regions of the 3D model from the individual user viewing paths.

Determining (at 404) the converged viewing path may include determining the fields-of-view and/or virtual camera positions and orientations that are frequently, commonly, and/or consistently found in the individual user viewing paths. In some embodiments, streaming system 100 evaluates the individual user viewing paths to determine which fields-of-view and/or virtual camera positions and orientations reoccur with a threshold frequency or in a percentage (e.g., in at least 50%) of the individual user viewing paths, and defines the converged viewing path to include those fields-of-view and/or virtual camera positions and orientations. In some other embodiments, streaming system 100 generates a heatmap for the parts, elements, or regions of the 3D model based on the frequency or total amount of time those parts, elements, or regions are viewable in the individual user viewing parts. For instance, the total amount of time that the 3D model is viewed across all tracked client devices is 10 minutes and the total amount of time that a first region of the 3D model is within the field-of-view of all individual user viewing paths is 1 minute, then streaming system 100 may generate a heatmap with a value of 2 at a first position in the heatmap that maps to or is associated with the first region of the 3D model. If the total amount of time that a second region of the 3D model is within the field-of-view of all individual user viewing paths is 6 minutes, then streaming system 100 may update the heatmap to have a value of 7 at a second position in the heatmap that maps to or is associated with the second region of the 3D model. If the total amount of time that a third region of the 3D model is within the field-of-view of all individual user viewing paths is 10 seconds, then streaming system 100 may update the heatmap to have a value of 0 at a third position in the heatmap that maps to or is associated with the third region of the 3D model. The heatmap therefore differentiates between the regions, parts, or elements of the 3D model that are commonly or consistently viewed and other regions, parts, or elements that are less commonly or consistently viewed.

Since splats are view dependent, streaming system 100 may generate two or more converged viewing paths from the tracked viewing paths of individual users. In particular, multiple splats may be defined in a 3D model for the same region, part, or element of the 3D model to realistically present the shapes, lighting, reflectivity, and colors of that region, part, or element from different angles or vantage points. A single field-of-view associated with a single converged viewing path may fail to present all the commonly or consistently viewed regions, parts, or elements from different angles or viewing perspectives. Rather than average all the viewing paths into a single converged viewing path or derive the single converged viewing path from the individual user viewing paths, streaming system 100 may determine different sets of tracked individual user viewing paths that present the commonly or consistently viewed parts or elements of the 3D model from different perspectives, angles, or sides, and generates different converged viewing paths based on the different sets of tracked individual user viewing paths. Consequently, each of the different converged viewing paths presents the 3D model from a different field-of-view, side, or perspective with a focus on different sets of important 3D model parts or elements in that field-of-view.

Figure 5:
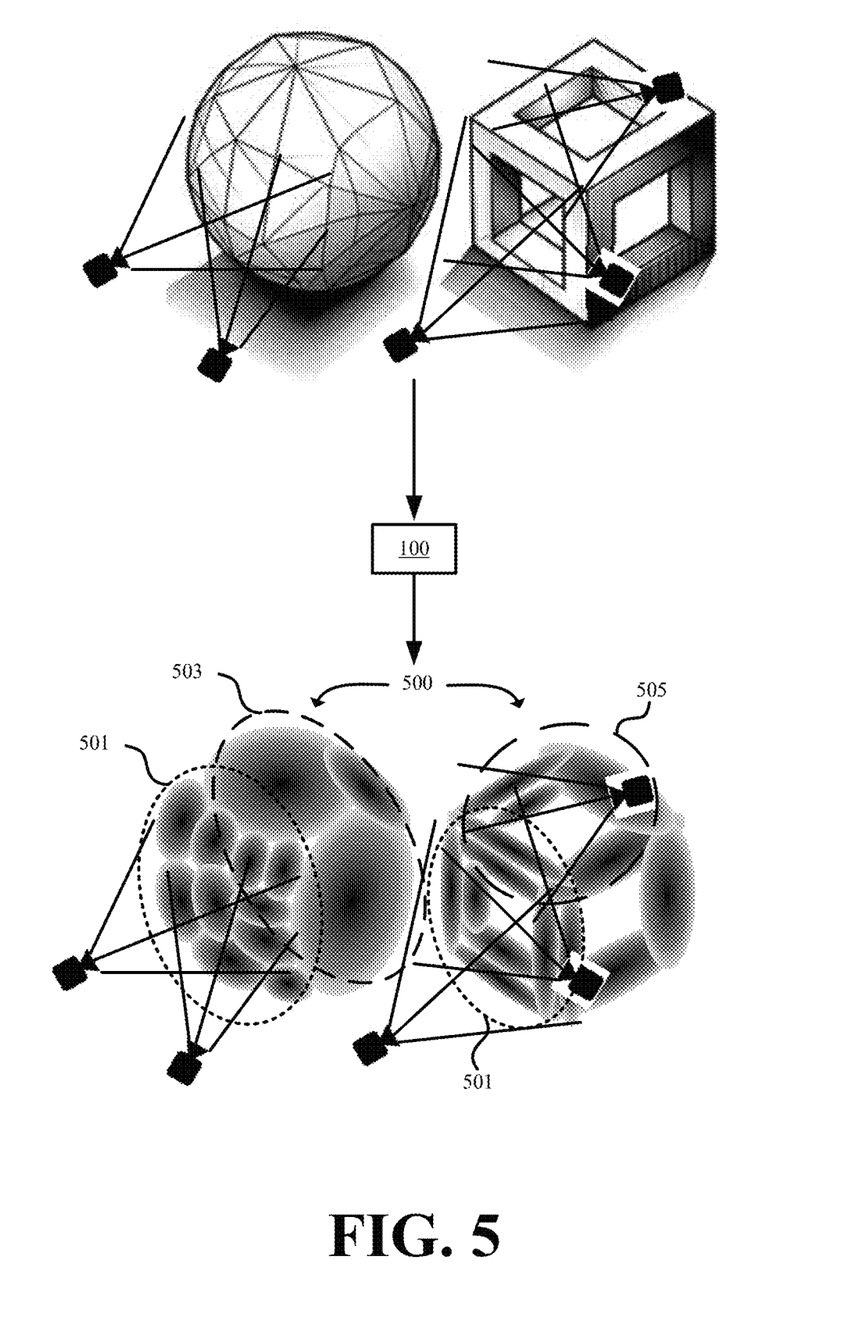
FIG. 5 illustrates an example of generating splats to represent different parts of a 3D model at different fidelities based on a heatmap that is derived from one or more converged viewing paths in accordance with some embodiments presented herein.

FIG. 5 illustrates an example of generating splats to represent different parts of a 3D model at different fidelities based on a heatmap that is derived from one or more converged viewing paths in accordance with some embodiments presented herein. 3D model 500 is a scene with two 3D objects. 3D model 500 includes regions of high fidelity 501, low fidelity 503, and varying intermediate levels of fidelity 505 that are defined according to the amount of time those regions remain in a field-of-view established by the one or more converged viewing paths and/or the proximity of those regions to the center of the field-of-view or the converged viewing path tracked for those objects or that 3D model 500.

Regions of high fidelity 501 are defined or represented by a greater number of splats than the other regions 503 and 505. Moreover, the splats representing the regions of high fidelity 501 may be smaller in size and/or have a greater variety of forms, shapes, and/or colors for an equally sized region represented by intermediate regions 505 or low fidelity regions 503.

In some embodiments, a particular part, element, or region of the 3D model may be represented by different sets of high fidelity and low fidelity splats. In some such embodiments, the particular part, element, or region may fall within the converged viewing path field-of-view from a first perspective, angle, or position and outside the converged viewing path field-of-view from a second perspective, angle, or position. Since the splats may be view-specific, streaming system 100 may generate a first number of high fidelity splats that are rendered or become visible when viewing the particular part, element, or region from the first perspective, angle, or position and a second number of low fidelity splats that are rendered or become visible when viewing the particular, element, or region from the second perspective, angle, or position.

In some embodiments, streaming system 100 may integrate the heatmap values to the splats that represent the parts or regions of the 3D model that are aligned with those heatmap values. Streaming system 100 may then directly reference the definition of the splats to determine which splats to stream for different fields-of-view.

Figure 6:
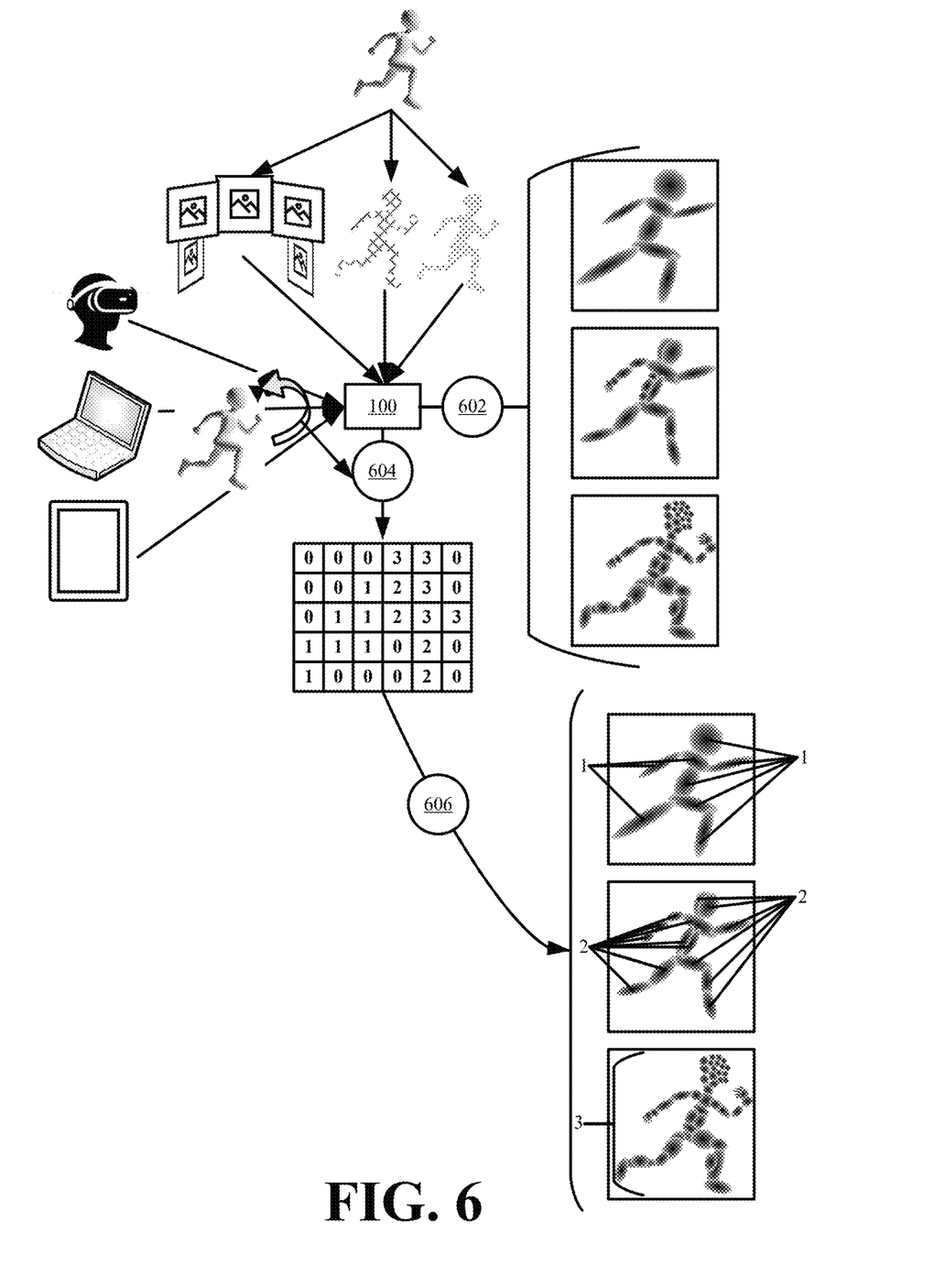
FIG. 6 illustrates an example of integrating heatmap values to splats in accordance with some embodiments presented herein.

FIG. 6 illustrates an example of integrating heatmap values to splats in accordance with some embodiments presented herein. Streaming system 100 generates (at 602) splats to represent different parts of a 3D model at different fidelities. In some embodiments, streaming system 100 performs multiple splat generation iterations to progressively increase the fidelity of the splats and to generate different sets of splats that represent the 3D model at different levels-of-detail. In some embodiments, streaming system 100 generates the splats at the increasing levels of fidelity for all parts of the 3D model. In some other embodiments, streaming system 100 generates the splats at the increasing levels of fidelity according to increasing priority values specified in the heatmap for specific parts. In other words, a single set of low fidelity splats are generated for parts of the 3D model that are only associated with the lowest priority value in the heatmap, whereas other parts associated with higher priority values may be generated with different sets of splats having increasing levels of fidelity.

Streaming system 100 generates (at 604) the heatmap from a converged viewing path that is derived from tracking the different parts of the 3D model that are in the field-of-view of different client devices and the time those parts remain in the field-of-view. The heatmap may be defined with values that differentiate frequently viewed or important parts of the 3D model from less frequently or lesser important parts of the 3D model.

Streaming system 100 assigns (at 606) the heatmap values to splats that represent aligned parts of the 3D model at the fidelity of the heatmap values. For instance, a first set of splats may be generated to represent the entirety of the 3D model at the lowest first fidelity. Accordingly, each splat of the first set of splats may be assigned or defined with a first value corresponding to the lowest first fidelity. A second set of splats may be generated to represent a first set of parts of the 3D model at a next higher second fidelity and each splat from the second set of splats may be assigned or defined with a second value corresponding to the next higher second fidelity. The second set of splats may be intermixed with or used to replace the splats from the first set of splats that represent the first set of parts. For instance, the second set of splats may be rendered with the first set of splats to increase the fidelity or detail for the first set of parts. The second set of splats may add density and/or additional variation to the splats from the first set of splats that represent the first set of parts or may represent the first set of parts with more smaller sized splats or more densely distributed splats than the first set of splats for the first set of parts. A third set of splats may be generated to represent a subset of the first set of parts of the 3D model at a highest third fidelity. Each splat of the third set of splats may be assigned or defined with a third value corresponding to the highest third fidelity. The third set of splats may further increase the density, detail, and/or variation for the subset of the first set of parts beyond the density, detail, and/or variation that is created with the second set of splats and/or the first set of splats.

Assigning (at 606) the heatmap values to the splats may include creating a new entry or parameter in the definition of each splat. For instance, each splat may be defined with a position (e.g., x, y, and z coordinates), a covariance, opacity, and color parameters or spherical harmonics. The definition may also be expanded to include a priority value for the fidelity associated with that splat. Accordingly, when the heatmap specifies a lowest fidelity for a particular part of the 3D model, streaming system 100 selects the one or more splats with positions corresponding to the particular part that have a first priority value associated with the lowest fidelity. However, when the heatmap specifies a highest fidelity for the particular part of the 3D model, streaming system 100 may select first splats with positions corresponding to the particular part that have the first priority value associated with the lowest fidelity, second splats with positions corresponding to the particular part that have priority values between the lowest and highest fidelity, and third splats with positions corresponding to the particular part that have a third priority value associated with the highest fidelity. Alternatively, streaming system 100 may select and stream only the third splats with positions corresponding to the particular part that have a third priority value associated with the highest fidelity and omit the first and second splats.

Figure 7:
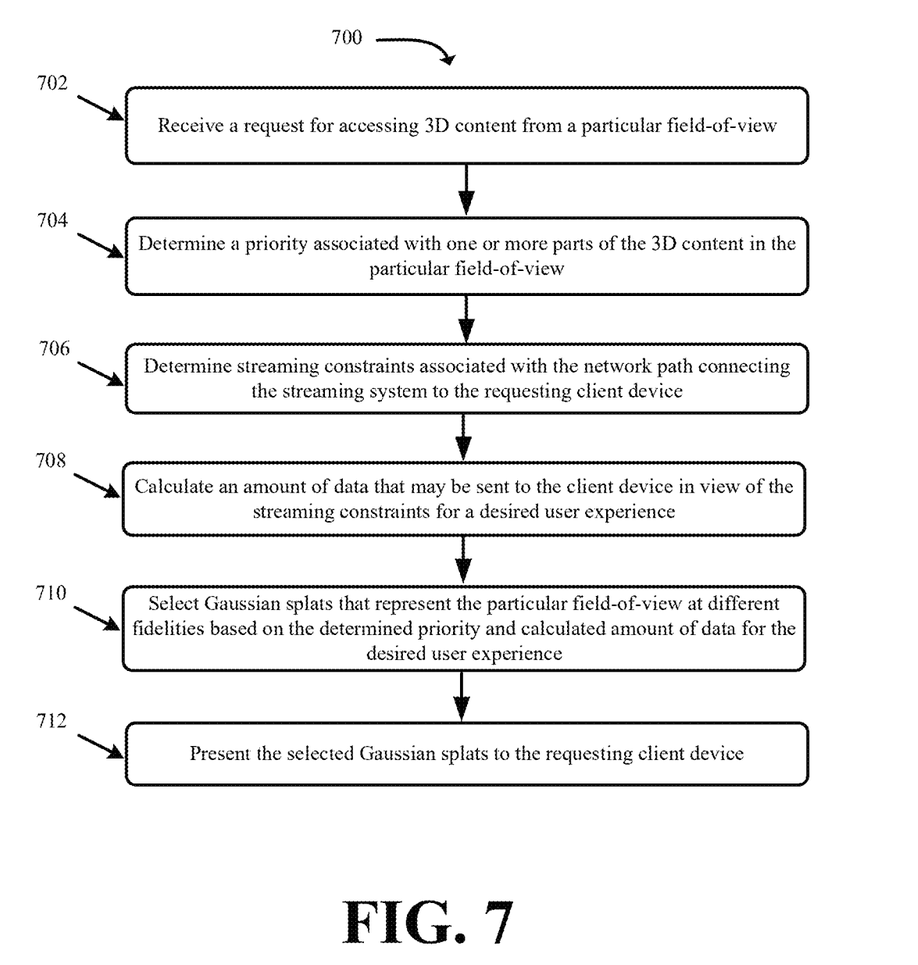
FIG. 7 presents a process for dynamically selecting splats to represent different perspectives of a 3D model at different fidelities based on changing importance of the 3D model parts entering the field-of-view at the different perspectives in accordance with some embodiments presented herein.

FIG. 7 presents a process 700 for dynamically selecting splats to represent different perspectives of a 3D model at different fidelities based on changing importance of the 3D model parts entering the field-of-view at the different perspectives in accordance with some embodiments presented herein. Process 700 is implemented by streaming system 100. Streaming system 100 includes one or more machines or devices with processor, memory, storage, network, and/or other hardware resources for the distribution, streaming, and/or rendering of 3D content. Accordingly, streaming system 100 may be part of a 3D video service, 3D gaming service, spatial computing experience provider, and/or other provider from which client devices may access optimized 3D content for distribution over bandwidth-limited data networks.

Process 700 includes receiving (at 702) a request for accessing 3D content from a particular field-of-view. The request may be issued over a data network from a client device to streaming system 100. The request may specify the particular field-of-view via a set of coordinates for a render position or a position and orientation for a virtual camera that defines the particular field-of-view.

Process 700 includes determining (at 704) a priority associated with one or more parts of the 3D content in the particular field-of-view. In some embodiments, streaming system 100 determines (at 704) the different priorities associated with all parts of the 3D content in the particular field-of-view. In some other embodiments, streaming system 100 determines (at 704) the priority or different priorities associated with one or more parts of the 3D content at the center of the particular field-of-view and/or that are frontmost in the particular field-of-view.

To determine (at 704) the priority, streaming system 100 may obtain the heatmap that is generated for the 3D content, and may align the heatmap to the 3D content in order to identify the priority values that are assigned to the parts of the 3D content in the particular field-of-view. Alternatively, the priority values may be assigned or defined as part of the splats that are generated to represent the particular field-of-view. Accordingly, streaming system 100 may identify the splats that are generated to represent the primitives or parts of the 3D content in the particular field-of-view, and may inspect the heatmap priority values assigned to the identified splats in order to determine (at 704) the priority associated with the one or more parts of the 3D content in the particular field-of-view.

Process 700 includes determining (at 706) streaming constraints associated with the network path connecting streaming system 100 to the requesting client device. The streaming constraints may include latency, bandwidth, packet loss, and/or other factors that impact the sending and receiving of data packets between streaming system 100 and the client device. Streaming system 100 may determine (at 706) the streaming constraints by exchanging test packets with the client device or based on measurements associated with receiving (at 702) the request and/or other packets that were previously exchanged with the requesting client device in order to establish a network connection or session, perform handshaking, and/or support other services or requests.

Process 700 includes calculating (at 708) an amount of data that may be sent to the client device in view of the streaming constraints for a desired user experience. The desired user experience may include presenting the 3D content at 30 frames per second and/or changes to the 3D content or the viewing of the 3D content within 5-10 frames of the change being requested. Accordingly, the amount of data and the fidelity of the 3D content decreases with greater streaming constraints and increases with fewer streaming constraints.

Process 700 includes selecting (at 710) splats that represent the particular field-of-view at different fidelities based on the determined (at 704) priority and calculated (at 708) amount of data for the desired user experience. Selecting (at 710) the splats includes selecting the splats that are associated with the lowest fidelity representation for all parts of the 3D content in the particular field-of-view, totaling the amount of data from the selected splats, selecting additional splats with the next highest fidelity or priority for the one or more parts that are associated with a higher priority or heatmap value when the total amount of data from the selected splats does not exceed the calculated (at 708) amount of data for the desired user experience, and continuing to increase the fidelity of the splats for the higher priority parts of the 3D content in the particular field-ofview until the fidelity matches the priority associated with that part or the total amount of data exceeds the calculated (at 708) amount of data for the desired user experience. For instance, streaming system 100 may initially increase the splat fidelity for the parts at the particular field-of-view center according to the heatmap values associated with those parts at the particular field-of-view center. If additional data may be sent without degrading the desired user experience, then streaming system 100 may increase the splat fidelity for the parts at the particular field-of-view periphery according to the heatmap values associated with those parts at the particular field-of-view periphery.

Process 700 includes presenting (at 712) the selected (at 710) splats to the requesting client device. In some embodiments, presenting (at 712) the selected (at 710) splats includes streaming the selected (at 710) splats to the requesting client device over the data network or network path connecting streaming system 100 to the client device. In some embodiments, presenting (at 712) the selected (at 710) splats includes providing the selected (at 710) splats to a rendering engine on the client device or loading them into memory of the client device for the rendering engine to process and/or render in order to create a visualization of the particular field-of-view. In some such embodiments, the client device may run a local instance of streaming system 100 such that there is no transfer of the splats off the client device or over a data network.

In some embodiments, the dynamic splat streaming may be optimized by accounting for additional factors in addition to or in place of the heatmap values and streaming constraints. In some such embodiments, streaming system 100 may account for factors such as the depth or placement of a 3D model part in the field-of-view, coloring, lighting, shadows, and reflectivity when determining the fidelity at which to select and stream the splats for that 3D model part.

Figure 8:
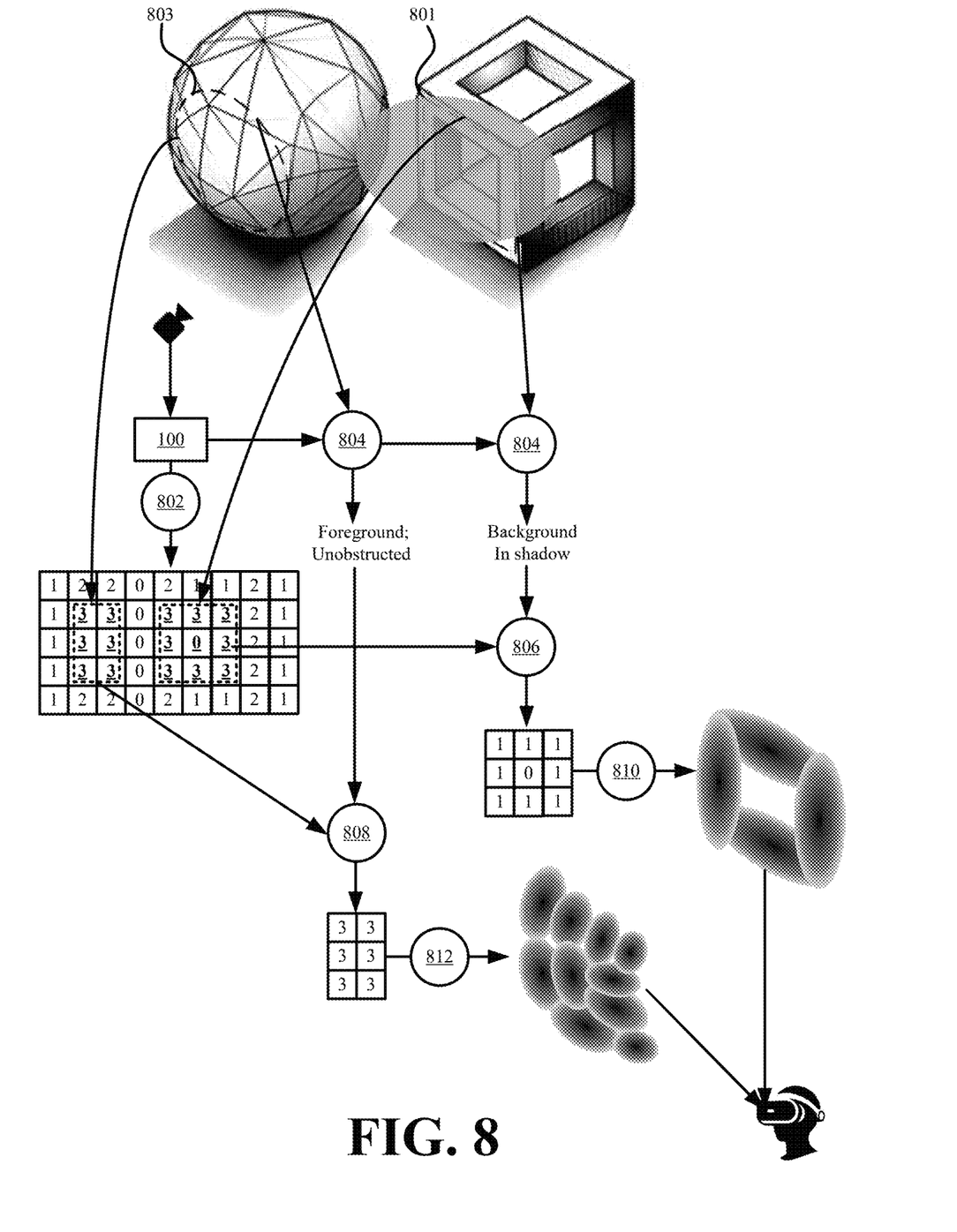
FIG. 8 illustrates an example of dynamic splatting based on heatmap values and attributes of the 3D model in accordance with some embodiments presented herein.

FIG. 8 illustrates an example of dynamic splatting based on heatmap values and attributes of the 3D model in accordance with some embodiments presented herein. Streaming system 100 identifies (at 802) the heatmap or priority values associated with different parts of a 3D model in a requested field-of-view. First part 801 and second part 803 at the middle or center of the field-of-view are associated with heatmap or priority values for the highest fidelity.

Streaming system 100 analyzes (at 804) positioning and/or visual characteristics for the different parts of the 3D model in the field-of-view. For instance, streaming system 100 determines the depth of the primitives or splats representing each part in the field-of-view to determine if that part is in the foreground, middle ground, or background. Similarly, streaming system 100 analyzes (at 804) the visual characteristics to differentiate parts that are too dark to resolve visually, that contain little or visual variation, that are transparent, and/or that have other attributes that are unaffected by the fidelity with which those parts are represented. In other words, a part of a 3D model that is pure black but contains some structural variety may be represented at the lowest fidelity since the color obscures or hides the structural variety. Likewise, a part of a 3D model that has a uniform flat shape and color may not look any different if represented by a single low-fidelity splat or 10 high-fidelity splats.

Streaming system 100 determines (at 806) that first part 801, despite being associated with a heatmap or priority value for the highest fidelity, receives no benefit from a high fidelity splat representation due to the first part 801 being in the background, lacking structural and/or color variation, being too dark, or being transparent. Streaming system 100 may adjust or reduce the heatmap or priority value for first part 801 to avoid streaming the data for extraneous high-fidelity splats that do not improve the visual quality or detail for first part 801. Conversely, streaming system 100 determines (at 808) that second part 803 will benefit from a high fidelity splat representation due to its positioning and visual characteristics in the field-of-view.

Streaming system 100 selects (at 810) a low fidelity splat representation for first part 801 because of the heatmap or priority values associated with first part 801 being adjusted due to the positioning and/or coloring of first part 801 in the requested field-of-view, and selects (at 812) a high fidelity splat representation for second part 803 based on the unadjusted heatmap or priority values associated with second part 803. The low fidelity splat representation uses less larger-sized splats to represent first part 801 and more smaller-sized splats to represent second part 803. Streaming system 100 streams the selected splats to the requesting client device.

Figure 9:
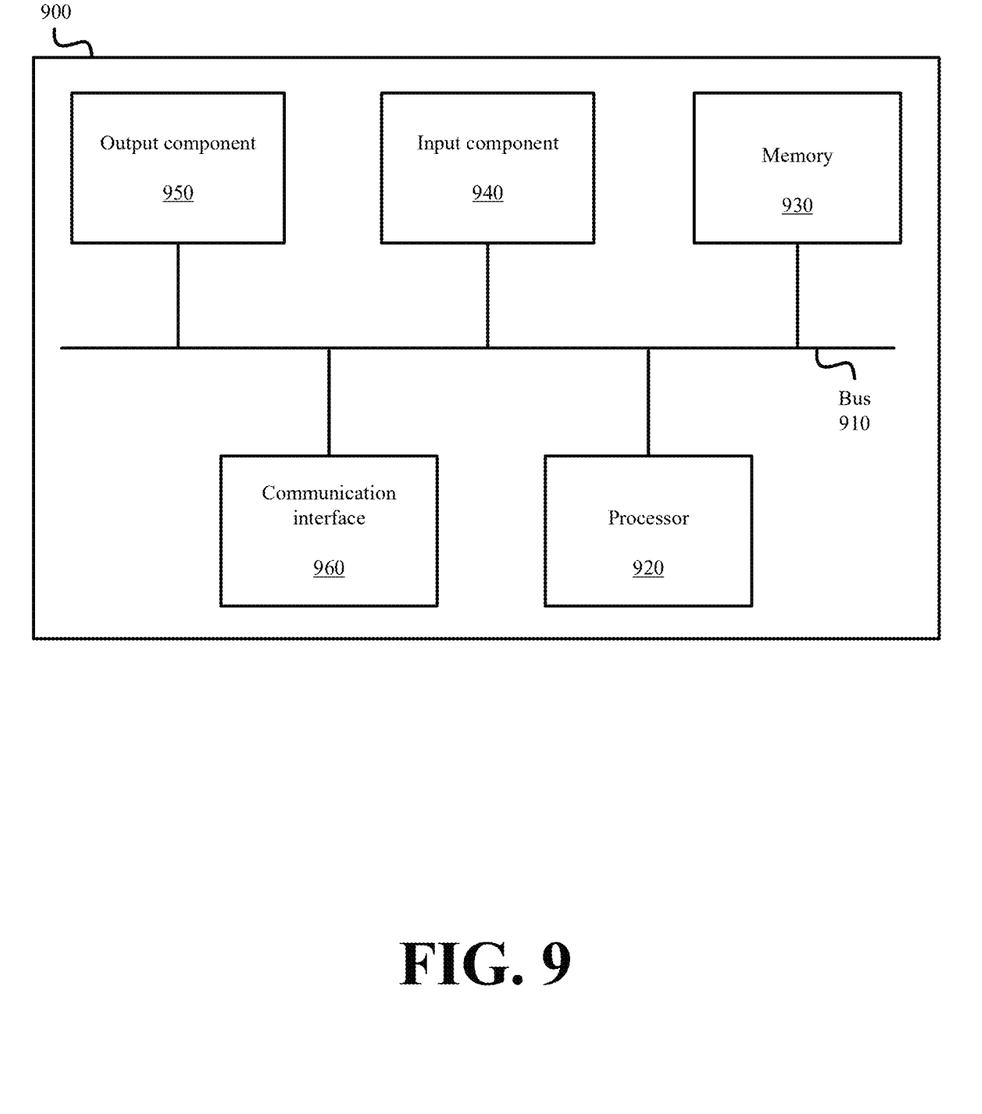
FIG. 9 illustrates example components of one or more devices, according to one or more embodiments described herein.

FIG. 9 is a diagram of example components of device 900. Device 900 may be used to implement one or more of the tools, devices, or systems described above (e.g., streaming system 100, the client devices, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
   tracking an amount of time that a plurality of users view different parts of three-dimensional (3D) content;
   generating a heatmap with a plurality of values at different positions in the heatmap, wherein each value at a different position is defined according to the amount of time that a different part of the 3D content that maps to that different position is viewed by the plurality of users;
   generating different sets of primitives to represent the 3D content at a plurality of different fidelities; and
   selectively streaming primitives from the different sets of primitives that are positioned within a particular part of the 3D content based on a value from the plurality of values that is defined at a position in the heatmap that maps to the particular part of the 3D content.

2. The method of claim 1, wherein selectively streaming the primitives comprises:
   streaming primitives that are positioned within the particular part of the 3D content from a first set of the different sets of primitives in response to a first value that is defined at the position in the heatmap that maps to the particular part of the 3D content; and
   streaming primitives that are positioned within the particular part of the 3D content from the first set and a second set of the different sets of primitives in response to a second value that is defined at the position in the heatmap that maps to the particular part of the 3D content, wherein the second value is associated with a higher fidelity than the first value.

3. The method of claim 2, wherein the primitives from the second set of the different sets of primitives increase fidelity for the particular part by adding detail to the primitives from the first set of the different sets of primitives.

4. The method of claim 1, wherein selectively streaming the primitives comprises:
   streaming primitives that are positioned within the particular part of the 3D content from a first set of the different sets of primitives in response to a first value that is defined at the position in the heatmap that maps to the particular part of the 3D content; and
   streaming primitives that are positioned within the particular part of the 3D content from a second set of the different sets of primitives in response to a second value that is defined at the position in the heatmap that maps to the particular part of the 3D content, wherein the second value is associated with a higher fidelity than the first value, and wherein the primitives from the second set of the different sets of primitives comprise a greater number of primitives and primitives that are smaller in size than the primitives from the first set of the different sets of primitives.

5. The method of claim 1 further comprising:
assigning a first fidelity value to primitives from a first set of the different sets of primitives that represent the 3D content at a first fidelity; and
assigning a second fidelity value to primitives from a second set of the different sets of primitives that represent the 3D content at a second fidelity.

6. The method of claim 5, wherein selectively streaming the primitives comprises:
streaming primitives that are assigned the first fidelity value and that are positioned within the particular part of the 3D content in response to the value being a first value that is associated with the first fidelity; and
streaming primitives that are assigned the first fidelity value or the second fidelity value and that are positioned within the particular part of the 3D content in response to the value being a second value that is associated with the second fidelity.

7. The method of claim 5, wherein selectively streaming the primitives comprises:
streaming primitives that are assigned the first fidelity value and that are positioned within the particular part of the 3D content in response to the value being a first value that is associated with the first fidelity; and
streaming primitives that are assigned the second fidelity value and that are positioned within the particular part of the 3D content in response to the value being a second value that is associated with the second fidelity.

8. The method of claim 1 further comprising:
receiving a request for a first part and a second part of the 3D content;
determining that a first position in the heatmap maps to the first part of the 3D content and that the first position is defined with a first value;
determining that a second position in the heatmap maps to the second part of the 3D content and that the second position is defined with a second value, wherein the first value is associated with a first fidelity and the second value is associated with a second fidelity from the plurality of different fidelities;
streaming primitives from a first set of the different sets of primitives that are positioned within the first part of the 3D content in response to the first value that is defined in the heatmap for the first part of the 3D content; and
streaming primitives from the first set and a second set of the different sets of primitives that are positioned within the second part of the 3D content in response to the second value that is defined in the heatmap for the second part of the 3D content.

9. The method of claim 1, wherein generating the heatmap comprises:
defining a first value for the position in the heatmap that maps to the particular part of the 3D content based on a first aggregate amount of time the particular part is viewed by the plurality of users; and
defining a second value for the position in the heatmap that maps to the particular part of the 3D content based on a second aggregate amount of time the particular part is viewed by the plurality of users.

10. The method of claim 1 further comprising:
receiving a request for viewing the 3D content from a particular field-of-view;
determining that the particular part of the 3D content is at a center of the particular field-of-view and that a second part of the 3D content is at a periphery of the particular field-of-view; and
streaming primitives from a first set of the different sets of primitives that are positioned within the second part of the 3D content without referencing values in the heatmap in response to the second part being at the periphery of the particular field-of-view and the first set of the different sets of primitives being associated with a particular fidelity at which the periphery is rendered.

11. The method of claim 1 further comprising:
receiving a request for viewing the 3D content from a particular field-of-view;
determining that the particular part of the 3D content is in a foreground of the particular field-of-view and that a second part of the 3D content is in a background of the particular field-of-view; and
streaming primitives from a first set of the different sets of primitives that are positioned within the second part of the 3D content without referencing values in the heatmap in response to the second part being in the background of the particular field-of-view and the first set of the different sets of primitives being associated with a particular fidelity at which the background is rendered.

12. The method of claim 1 further comprising:
receiving a request for viewing the 3D content from a particular field-of-view;
determining streaming constraints associated with a device requesting the 3D content;
determining that the particular part is within the particular field-of-view and is associated with a first value in the heatmap and that a second part of the 3D content is within the particular field-of-view and is associated with a second value in the heatmap that specifies a lower fidelity than the first value; and
wherein selectively streaming the primitives comprises:
streaming primitives from a first set of the different sets of primitives that are positioned within the particular part and the second part of the 3D content, wherein the first set of the different sets of primitives is associated with a lowest fidelity;
determining an amount of additional bandwidth for streaming the 3D content based on the streaming constraints and an amount of data associated with streaming the primitives from the first set of the different sets of primitives; and
streaming primitives from at least a second set of the different sets of primitives that are positioned within the particular part of the 3D content based on first value in the heatmap being associated with a higher fidelity than the lowest fidelity.

13. A system comprising:
one or more hardware processors configured to:
track an amount of time that a plurality of users view different parts of three-dimensional (3D) content;
generate a heatmap with a plurality of values at different positions in the heatmap, wherein each value at a different position is defined according to the amount of time that a different part of the 3D content that maps to that different position is viewed by the plurality of users;

generate different sets of primitives to represent the 3D content at a plurality of different fidelities; and selectively stream primitives from the different sets of primitives that are positioned within a particular part of the 3D content based on a value from the plurality of values that is defined at a position in the heatmap that maps to the particular part of the 3D content.

14. The system of claim 13, wherein selectively streaming the primitives comprises:

streaming primitives that are positioned within the particular part of the 3D content from a first set of the different sets of primitives in response to a first value that is defined at the position in the heatmap that maps to the particular part of the 3D content; and streaming primitives that are positioned within the particular part of the 3D content from the first set and a second set of the different sets of primitives in response to a second value that is defined at the position in the heatmap that maps to the particular part of the 3D content, wherein the second value is associated with a higher fidelity than the first value.

15. The system of claim 14, wherein the primitives from the second set of the different sets of primitives increase fidelity for the particular part by adding detail to the primitives from the first set of the different sets of primitives.

16. The system of claim 13, wherein selectively streaming the primitives comprises:

streaming primitives that are positioned within the particular part of the 3D content from a first set of the different sets of primitives in response to a first value that is defined at the position in the heatmap that maps to the particular part of the 3D content; and streaming primitives that are positioned within the particular part of the 3D content from a second set of the different sets of primitives in response to a second value that is defined at the position in the heatmap that maps to the particular part of the 3D content, wherein the second value is associated with a higher fidelity than the first value, and wherein the primitives from the second set of the different sets of primitives comprise a greater number of primitives and primitives that are smaller in size than the primitives from the first set of the different sets of primitives.

17. The system of claim 13, wherein the one or more hardware processors are further configured to:

assigning a first fidelity value to primitives from a first set of the different sets of primitives that represent the 3D content at a first fidelity; and assigning a second fidelity value to primitives from a second set of the different sets of primitives that represent the 3D content at a second fidelity.

18. The system of claim 17, wherein selectively streaming the primitives comprises:

streaming primitives that are assigned the first fidelity value and that are positioned within the particular part of the 3D content in response to the value being a first value that is associated with the first fidelity; and streaming primitives that are assigned the first fidelity value or the second fidelity value and that are positioned within the particular part of the 3D content in response to the value being a second value that is associated with the second fidelity.

19. The system of claim 17, wherein selectively streaming the primitives comprises:

streaming primitives that are assigned the first fidelity value and that are positioned within the particular part of the 3D content in response to the value being a first value that is associated with the first fidelity; and streaming primitives that are assigned the second fidelity value and that are positioned within the particular part of the 3D content in response to the value being a second value that is associated with the second fidelity.

20. A non-transitory computer-readable medium storing instructions that, when executed by one or more processors of a system, cause the system to perform operations comprising:

tracking an amount of time that a plurality of users view different parts of three-dimensional (3D) content;

generating a heatmap with a plurality of values at different positions in the heatmap, wherein each value at a different position is defined according to the amount of time that a different part of the 3D content that maps to that different position is viewed by the plurality of users;

generating different sets of primitives to represent the 3D content at a plurality of different fidelities; and selectively streaming primitives from the different sets of primitives that are positioned within a particular part of the 3D content based on a value from the plurality of values that is defined at a position in the heatmap that maps to the particular part of the 3D content.

* * * * *